United States Patent
Holden et al.

(10) Patent No.: US 6,568,818 B2
(45) Date of Patent: *May 27, 2003

(54) THREE DIMENSIONAL REAL IMAGE SYSTEM

(75) Inventors: Roger W. Holden, Lawrence, KS (US); Robert A. Babcock, Lawrence, KS (US)

(73) Assignee: 21st Century Sound and Vision, Inc., Lawrence, KS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/275,167

(22) Filed: Mar. 24, 1999

(65) Prior Publication Data

US 2001/0036025 A1 Nov. 1, 2001

(51) Int. Cl.⁷ .................................................. G02B 5/10
(52) U.S. Cl. ....................... 359/859; 359/857; 359/858; 359/864; 359/871
(58) Field of Search ................................. 359/859, 857, 359/858, 864, 871, 479, 471, 472, 478

(56) References Cited

U.S. PATENT DOCUMENTS 4,647,966 A * 3/1987 Phillips et al. ................ 358/88
5,311,357 A * 5/1994 Summer et al. ............ 359/479

* cited by examiner

Primary Examiner—Mohammad Sikder
(74) Attorney, Agent, or Firm—Stephen R. Robinson

(57) ABSTRACT

An improved optical apparatus and system for producing a three-dimensional real image of an object. The apparatus includes a support member, a first concave reflective surface affixed to the support member and having an associated focal length, and a second concave reflective surface affixed to the support member. The first concave reflective surface and the second concave reflective surface are placed in substantially fixed spatial relationship to each other to define an acute angle so that when the object is appropriately placed further than the focal length of the first concave reflective surface, the apparatus produces a three-dimensional real image of the object.

In preferred embodiments the first and second reflective surfaces are spherical mirrors, the support member includes an object base suitable for securely positioning the object and the support member includes an outer housing such that the object, the fight source, the first mirror and the second mirror are not externally observable by a viewer.

In alternative embodiments the object can independently generate fight (e.g. a display device). In other alternative embodiments, the first and second reflective surfaces are in substantially fixed, spatially parallel relationship.

12 Claims, 2 Drawing Sheets

THREE DIMENSIONAL REAL IMAGE SYSTEM

BACKGROUND OF THE INVENTION

1. Field of the Invention

The present invention relates generally to the field of optical imaging and specifically to a system for generation of three-dimensional real images.

2. Description of the Related Art

One of the important attempts at producing a three-dimensional real image generation system is Elings, U.S. Pat. Ser. No. 3,647,284, which features two opposing concave mirrors having a common optical axis. One of the mirrors presents an aperture. The object is placed close to the opposite facing mirror to generate a real image beyond the aperture. The Elings system is somewhat restrictive in use because of restrictions in where the object may be placed. In particular, it must be placed fairly closely to the mirror not having an aperture. Also, it has the drawback of not being easy to manufacture since construction of the one mirror requires the inclusion of an aperture. This of course also adds to the cost of manufacturing.

Welck, U.S. Pat. Ser. No. 4,802,750, features mirrors of paraboloid-of-revolution shape, the two mirrors configured to present an associated real object zone to which the object must be placed for optimal use. There is also associated a real image zone in which vicinity the real image is perceived. The Welck system also has restrictions as to object placement since the object must be placed in a relatively constricted spatial area. Also, due to the specific shape of the mirrors required (i.e. mirrors of paraboloid-of-revolution shape) this adds to the cost and difficulty of manufacture.

A third system in this field is the Summer system, U.S. Pat Ser. No. 5,311,357. Two concave mirrors are placed at an appropriate acute angle so that when an object is placed inside the focal length of the first mirror a real-image is generated. Here again, the object is greatly restricted as to the area in which it can be placed relative to the first mirror and also the size of the object that can be utilized by the system is restricted because of the relative closeness of the object to the first mirror. The Summer patent refers to a first mirror and second mirror in the sense that the rays emanating from the object first strike mirror two and then mirror one. It should be noted that the reverse terminology is used herein with reference to the present invention and all other Systems, including Summer.

Important prior systems in this field have spatial limitations in terms of object placement. That is to say, the object must be placed in a relatively restricted zone, typically in close proximity to the first mirror for optimal performance. For example, in the Summer system, the object must be placed within the focal length of the first mirror. Other systems may have other similar types of limitations all of which, as discussed above, tend to restrict the utilization of the system since objects cannot be placed farther away from the mirrors. Also many of the systems in this field have ease and cost of manufacture issues so that they are not readily commercially manufacturable both for reasons of construction and of cost.

SUMMARY OF THE INVENTION

The improved optical apparatus and system of the present invention produces a three-dimensional real image of an object. The apparatus includes a support member, a first concave reflective surface affixed to the support member and having an associated focal length, and a second concave reflective surface affixed to the support member. The first concave reflective surface and the second concave reflective surface are placed in substantially fixed spatial relationship to each other to define an acute angle. When an object is appropriately placed further from the first concave reflective surface than the focal length thereof, the apparatus produces a realistic three-dimensional real image of the object.

In preferred embodiments the first and second reflective surfaces are spherical mirrors, the support member includes an object base suitable for securely positioning the object and the support member further includes an outer housing such that the object, the light source, the first mirror and the second mirror are not externally observable by a viewer.

In alternative embodiments the object can independently generate light (e.g. a display device). In other alternative embodiments, the first and second reflective surfaces are in substantially fixed, spatially parallel relationship.

DETAILED DESCRIPTION OF THE INVENTION

Figure 1:
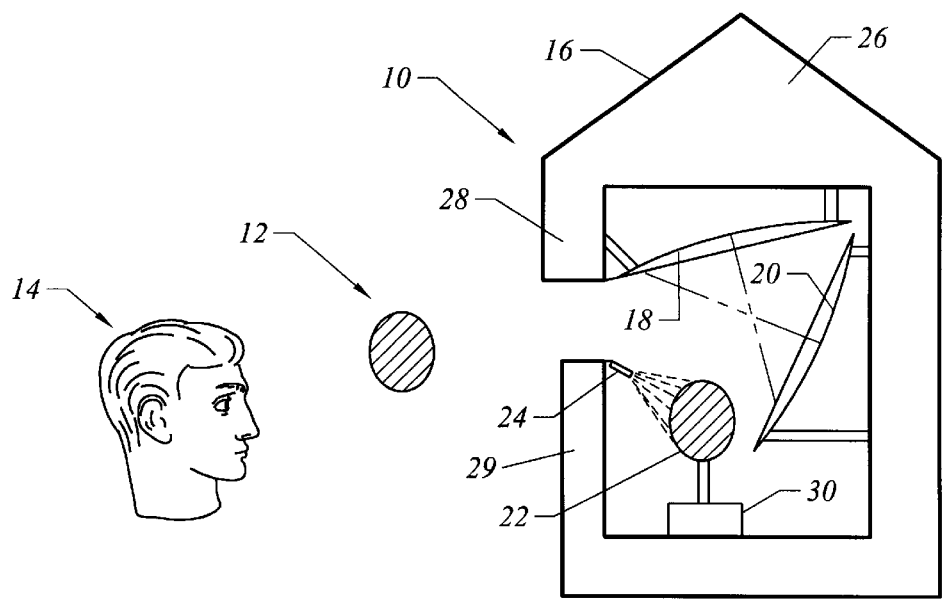
FIG. 1 is an elevational view of a subject viewing a real image generated by the system of the present invention.

Referring now to the drawings in general and FIG. 1 in particular, a preferred embodiment of the present invention is illustrated as system 10 producing a real image 12 viewed by a human subject 14. System 10 includes a frame or support member 16, a first concave reflective surface or mirror 18, a second concave reflective surface or mirror 20 and an object 22. An illumination source or 24 is also included although those skilled in the art will readily appreciate that the inclusion or exclusion of a light source is an optional design choice.

Frame 16 includes an outer housing 26, a front hood portion 28, a front bottom portion 29 and an object base or support member 30.

Figure 2:
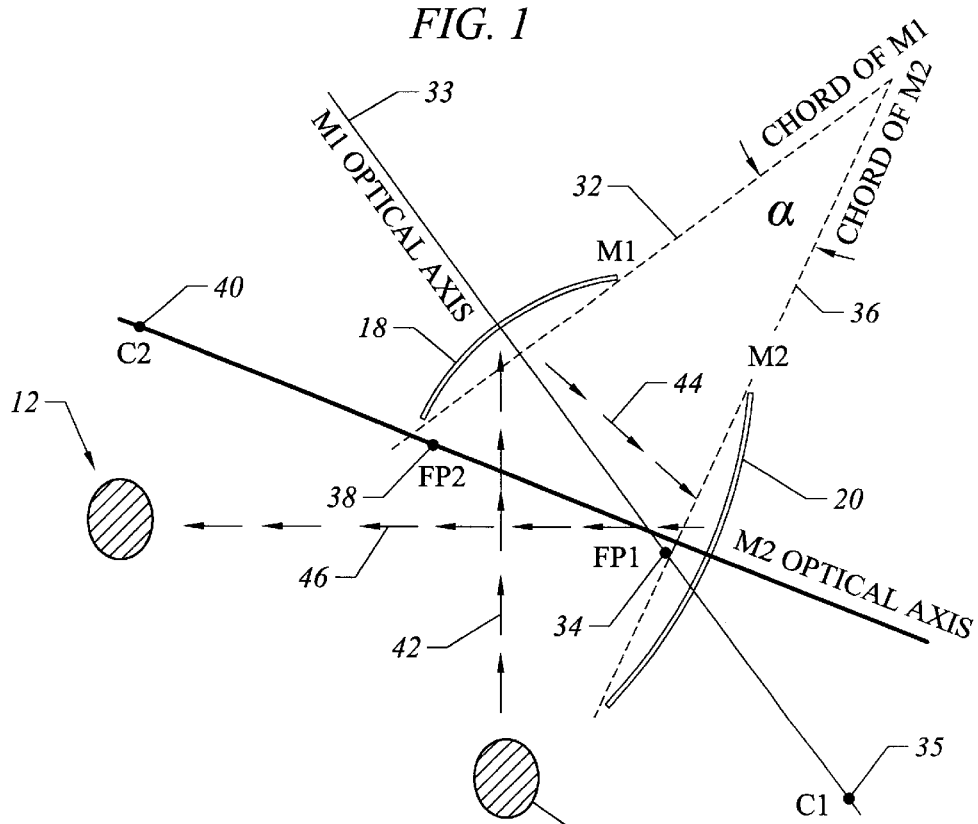
FIG. 2 is a partial view of the system of FIG. 1 highlighting the acute angle configuration of reflective surfaces typical of the preferred embodiment of the present invention.

Referring to FIG. 2, first mirror 18 and second mirror 20 are shown in terms of their angular configuration in accordance with the invention. The first mirror 18 presents a first chord 32, a first optical axis 33, a first focal point 34, and a first center of curvature 35.

Second mirror 20 presents a second chord 36, a second optical axis 37, a second focal point 38 and a second center of curvature 40. It should be noted that all proportions and configurations shown in all the drawings herein are not to scale.

Also shown are first light path segment 42, second light path segment 44, and third light path segment 46 which will be discussed below.

First chord 32 and second chord 36 present an acute angle. In assembling system 10, one of the main tasks in making an operative system is to correctly configure the angle alpha of first chord 32 and second chord 36. This is typically done empirically. One technique for assembly is to start with an angle alpha of about 45 degrees and then physically adjusting first mirror 18 and second mirror 20 until the optimum angle is achieved. A real image of substantial visibility is relatively easy to achieve but more precise angling and positioning may be required to avoid unwanted reflections from frame 16 (not shown in FIG. 2) or the environment generally.

Figure 3:
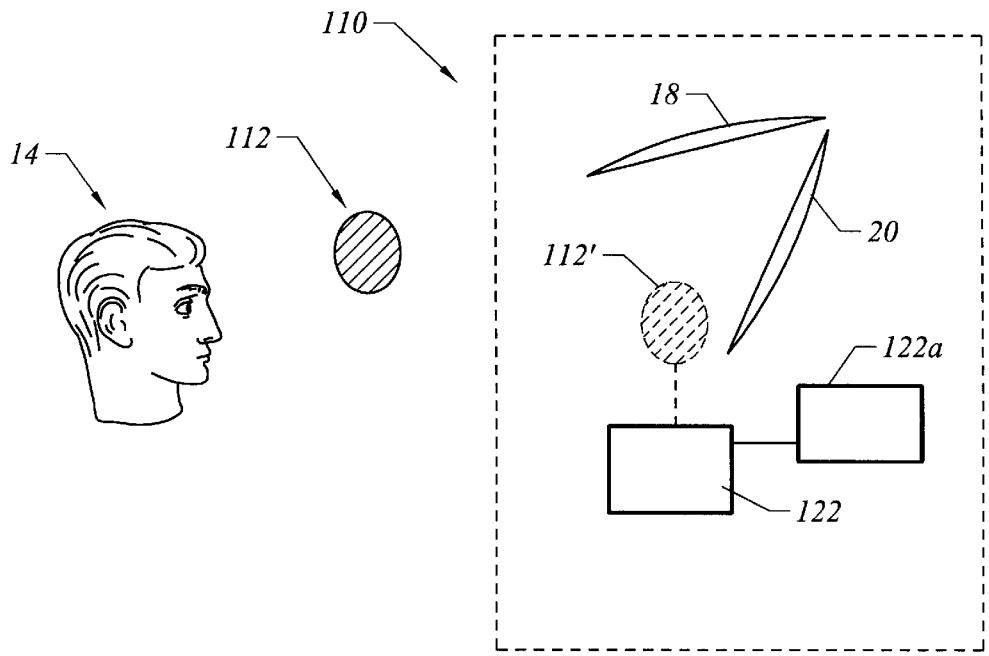
FIG. 3 is a partially schematic view of an alternative embodiment of the present invention wherein the object incorporated into the system is a display device.

Referring to FIG. 3, an alternative system 110 of the present invention is shown, wherein in substitution of object 22 of FIG. 1 a self-illuminated object 122 is schematically represented. Object 122 generates an initial image 112' inside system 110 which in turn produces image 112 as seen by subject 14. Self-illuminated object 122 could be a simple light source which generates an image 112, for example a candle or light bulb. Alternatively, self-illuminating object 122 could be a display device such as a cathode ray tube, flat panel display, or other such device. In this display device alternative, associated image process electronics 122a may be used advantageously as discussed below.

Figure 4:
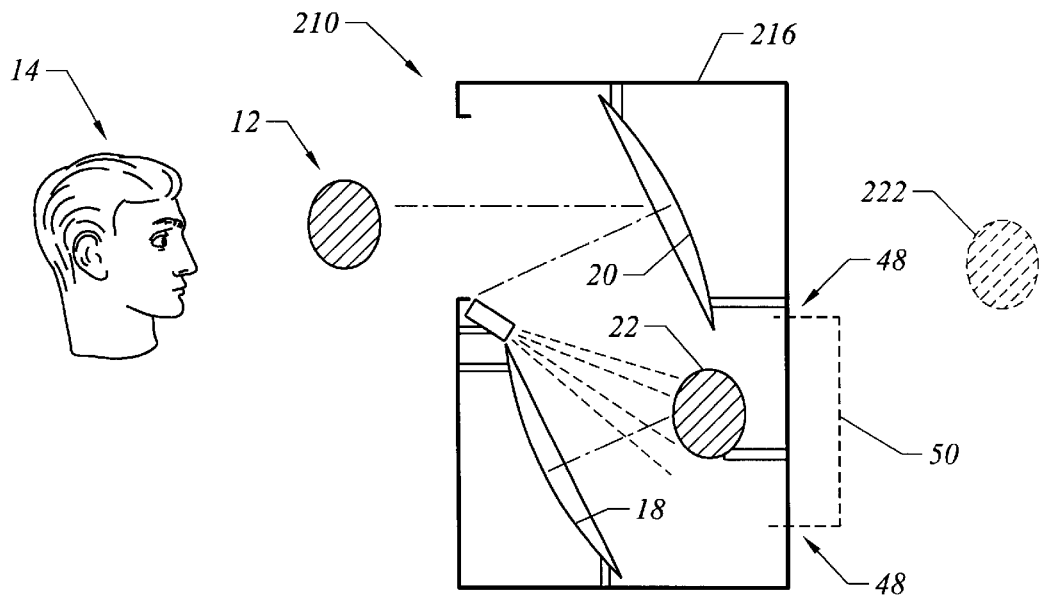
FIG. 4 is yet another alternative embodiment of the present invention featuring reflective surfaces in parallel configuration.

Referring to FIG. 4, another alternative system 210 of the present invention is shown. In this embodiment it will be noted that first mirror 18 and second mirror 20 are in a different and parallel configuration, meaning that first chord 32 and second chord 36 (not shown in FIG. 4) are in parallel rather than at an acute angle as shown in FIG. 2, so that there is a different optical path for the light rays travelling in the system. In FIG. 4 the light paths are only partially shown for ease of illustration but will be readily understood by those skilled in the art.

Additionally, as an alternative to object 22 as shown, an aperture 48 at the back of frame 216 can be formed by removing a portion of frame 216 as at reference numeral 50. In this fashion, an alternative object 222 (shown in dashed lines to distinguish from object 22) can be utilized. For example, object 222 so large as to not conveniently fit within a normal sized housing. Another application for object 222 could be to create an illusion in a large stage magic act, when it is desired that object 222 not be visible from the other side of frame 216.

In operation, and referring generally to FIG. 1 and FIG. 2, object 22 is placed on object base 30. Object 22 is typically securely positioned relative to the object base. Object base 30 can be mechanically constructed to allow for rotation or other spatial manipulation of object 22 for any effect desired for real image 12. Additionally, object 22 may move independently of object base 30, such as a battery operated toy.

Light source 24 is optional and in alternative embodiments ambient light could be sufficient to illuminate normal sized objects within the housing. It should be noted that frame 16 may be advantageously sized or configured to avoid unwanted reflections, especially at front bottom portion 29, thereby enhancing the quality of image 12.

Referring to FIG. 2, light rays strike object 22 and then follow the path towards first mirror 18 as indicated at first path segment 42. The light is then reflected from first mirror 18 as indicated at second path segment 44 so as to strike second mirror 20. The light is then reflected from second mirror 20 as indicated by third path segment 46 and then emerges from system 10 (not fully shown in FIG. 2 ) to generate three-dimensional real image 12. Depending upon the construction of the system, it will be readily appreciated by those skilled in the art that the actual light path may encompass many iterative light path segments between first mirror 18 and second mirror 20 before final emergence from system 10 to generate object 12. Also object base may be movable (e.g. circularly rotatable as a mobile), so it will be appreciated that the light path may be dynamic.

The system 10 and other alternatives discussed herein produce a very realistic image 12 which is believed to be superior in quality to that of a hologram or other state of the art three-dimensional images. The quality of the image is such that image 12 may appear to be laser and/or computer generated even though in the preferred embodiment the effect is achieved with mirrors. The image effect can be further improved by appropriate use of other graphical elements so as to "frame" image 12 and thereby enhancing the realism and three dimensional quality thereof As will readily be appreciated, frame 16 (especially front hood 28 and front bottom portion 29) tend to obscure components such as first mirror 18, second mirror 20 and object 22 from view by subject 14. In this fashion, the illusionary effect is enhanced since all the human subject 14 will see under normal operation is real image 12 and the external portions of frame 16. The only restriction on placement of the object has to do with the placement of object 22 in relation to first mirror 18. In the present invention object 22 must be placed a greater linear distance than the focal length of first mirror 18. Hence, object 22 must be distanced further from first mirror 18 than first focal point 34. Accordingly, object 22 may be placed at a much greater distance from first mirror 18 if desirable. In this fashion, an object may be utilized at a greater distance from the mirrors than was achievable in the Summer patent discussed above.

Referring now to FIG. 3, it will be readily appreciated that in the case where self-illuminating object 122 is a substantially flat display device such as a flat panel display, real image 112 may have a less three-dimensional character since it will be the image of a substantially two dimensional object 122. However in such cases, where initial image 112' is rotational in nature (e.g. either because of computer graphics or by video production), it is believed that image 112 can be made to be substantially three dimensional in appearance.

Referring to FIG. 4, system 210 may be used with object 22. Alternatively, the parallel configuration of first mirror 18 and second mirror 20 allows an object such as object 222 (as distinguished from object 22) to be placed a distance behind frame 216 so long as object 222 is aligned with aperture 48. In this fashion, object 222 can be placed a distance away from frame 216, allowing for greater physical flexibility. Also, large objects (for example, cars) could be used without the logistical problem of trying to place such an object within a housing 216 which would normally not be as large as a car.

It should be understood that the invention is not limited to the described embodiments particularly described herein. Rather, further alternatives can be employed in practicing the present invention. It is intended that the following claims define the scope of the present invention and that structures and methods within the scope of these claims and their equivalents be covered thereby.

What is claimed is:

1. An optical apparatus for producing a three-dimensional real image of an object, the apparatus comprising:
   a support member;
   a first concave reflective surface affixed to the support member and having an associated focal length; and
   a second concave reflective surface affixed to the support member, wherein the first concave reflective surface and the second concave reflective surface are in substantially fixed spatial relationship to each other to define an acute angle and such that when the object is appropriately placed further than the focal length of the first concave reflective surface, and a set of light rays propagates from the object to the first concave reflective surface, then to the second concave reflective surface and then converge so that the apparatus produces a 3-dimensional real image of the object.

2. The optical apparatus of claim 1 wherein the support member includes an object base suitable for securely positioning the object.

3. The optical apparatus of claim 1 further including a light source operatively associated with the object.

4. The optical apparatus of claim 1 wherein the first and second reflective surfaces are concave spherical mirrors.

5. An optical apparatus for producing a three-dimensional real image of an object, the apparatus comprising:

a support member, a first concave spherical mirror affixed to the support member and having an associated focal length; and a second concave spherical mirror affixed to the support member, wherein the first concave spherical mirror and the second concave spherical mirror are in substantially fixed spatial relationship to each other to define an acute angle and such that when the object is appropriately placed further than the focal length of the first concave spherical mirror, the apparatus produces a three-dimensional real image of the object.

6. The optical apparatus of claim 5 wherein the support member includes an object base suitable for securely positioning the object.

7. The optical apparatus of claim 5 wherein the support member includes an outer housing such that the object, the light source, the first mirror and the second mirror are not externally observable.

8. An optical system for producing a three-dimensional real image viewable by a subject, the system comprising:

an object;

a support member including an object base suitable for securely positioning the object and further including an outer housing, a first concave spherical mirror affixed to the support member and having an associated focal length;

a second concave spherical mirror affixed to the support member; and a light source operatively associated with the object, the object base and the first and second spherical mirrors, wherein the first mirror and the second mirror are in substantially fixed spatial relationship to each other to define an acute angle and such that when the object is appropriately placed further than the focal length of the first concave spherical mirror, the apparatus produces a three-dimensional real image of the object and yet the object, the light source, the first mirror and the second mirror are not readily observable by the subject.

9. The optical system of claim 8 wherein the object includes structure for generating light.

10. An optical apparatus for producing a real image, the apparatus comprising:

a support member;

a first concave reflective surface affixed to the support member and having an associated focal length;

a second concave reflective surface affixed to the support member; and a display device suitable for generating a display image, the display device operatively associated with the support member and first and second reflective surfaces, wherein the first reflective surface and the second reflective surface are in substantially fixed spatial relationship to each other to define an acute angle and such that when the display device is appropriately placed further than the focal length of the first concave reflective surface, the apparatus produces a real image of the display image.

11. The optical apparatus of claim 10 wherein the display device includes a cathode ray tube.

12. The optical apparatus of claim 10 wherein the display device includes a flat panel display.

* * * * *